United States Patent
Shivanna et al.

(10) Patent No.: US 11,647,037 B2
(45) Date of Patent: May 9, 2023

(54) PENETRATION TESTS OF SYSTEMS UNDER TEST

(71) Applicant: HEWLETT PACKARD ENTERPRISE DEVELOPMENT LP, Houston, TX (US)

(72) Inventors: Suhas Shivanna, Karnataka (IN); Supriya Kamthania, Karnataka (IN); Nishant Rawtani, Karnataka (IN); Anoop Chandra Bidugalu Nagesh, Karnataka (IN); Ragashree Mysuru Chandrashekar, Karnataka (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 765 days.

(21) Appl. No.: 16/776,881

(22) Filed: Jan. 30, 2020

(65) Prior Publication Data
US 2021/0243216 A1 Aug. 5, 2021

(51) Int. Cl.
G06F 21/57 (2013.01)
H04L 9/40 (2022.01)

(52) U.S. Cl.
CPC ........ H04L 63/1433 (2013.01); G06F 21/577 (2013.01); H04L 63/1416 (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 7,594,142 B1* | 9/2009 | O'Leary | ............... | G06F 21/577 714/38.11 |
| 8,490,196 B2 | 7/2013 | Lucangeli et al. | | |
| 9,432,394 B1* | 8/2016 | Lahiri | ................... | G06F 21/552 |
| 2008/0271025 A1* | 10/2008 | Gross | ................... | G06F 21/577 718/102 |
| 2011/0035803 A1* | 2/2011 | Lucangeli Obes | | ........................ H04L 63/1433 726/25 |
| 2014/0237606 A1* | 8/2014 | Futoransky | ........... | G06F 21/552 726/25 |
| 2016/0205122 A1 | 7/2016 | Bassett | | |
| 2017/0091460 A1* | 3/2017 | Kuhr | ..................... | G06F 21/577 |
| 2018/0324210 A1* | 11/2018 | Gadot | ................. | H04L 63/1433 |

(Continued)

OTHER PUBLICATIONS

Jonathan Schwartz, "Autonomous Penetration Testing Using Reinforcement Learning," Nov. 16, 2018, pp. 1-81, The University of Queensland, Australia.

(Continued)

*Primary Examiner* — Fatoumata Traore
(74) *Attorney, Agent, or Firm* — Trop, Pruner & Hu, P.C.

(57) ABSTRACT

In some examples, a system receives information traffic communicated over a network by or with a system under test (SUT), and analyzes the information traffic to identify a potential attack point in the SUT and a technology used by the SUT. The system determines a collection of penetration tests for testing a stack comprising a plurality of layers associated with the SUT based on the identified potential attack point and the identified technology, and further based on a dynamic knowledge base that includes information relating to vulnerabilities and threats.

18 Claims, 3 Drawing Sheets

(56) References Cited

U.S. PATENT DOCUMENTS

2018/0365429 A1* 12/2018 Segal .................... H04L 67/535

OTHER PUBLICATIONS

Mohamed C. Ghanem and Thomas M. Chen, "Reinforcement Learning for Efficient Network Penetration Testing," Dec. 20, 2019, pp. 1-23, MDPI, Switzerland.
Sflow, Streaming Telemetry, OpenConfig, Jun. 6, 2016 (3 pages).
Tian-Yang Zhou et al., "NIG-AP: A New Method for Automated Penetration Testing," Frontiers of Information Technology & Electronic Engineering, Oct. 18, 2019, pp. 1277-1288.
Wikipedia, AngularJS last edited Jan. 18, 2020 (5 pages).
Wikipedia, NetFlow lasted edited on Jan. 16, 2020 (6 pages).
Wikipedia, Remote Desktop Protocol last edited Jan. 16, 2020 (6 pages).
Wikipedia, Secure Shell last edited Jan. 13, 2020 (6 pages).
Wikipedia, PowerShell last edited Jan. 3, 2020 (18 pages).

* cited by examiner

PENETRATION TESTS OF SYSTEMS UNDER TEST

BACKGROUND

An information technology (IT) environment can include various resources that are useable by entities to perform operations. Examples of resources include processing resources (e.g., computers, processors, etc.), storage resources (e.g., memories, persistent storage devices, etc.), communication resources (e.g., networks, network switches or routers, firewalls, etc.), machine-readable instruction resources (e.g., software such as applications and operating systems, firmware such as boot firmware, management instructions such as to perform out-of-band management of devices, etc.).

An IT environment may be subject to attacks either from within or from outside the IT environment. Such attacks can pose threats to the IT environment, since data can be stolen from IT environment, attacks can degrade performance of the IT environment, and so forth.

BRIEF DESCRIPTION OF THE DRAWINGS

Some implementations of the present disclosure are described with respect to the following figures.

Figure 1:
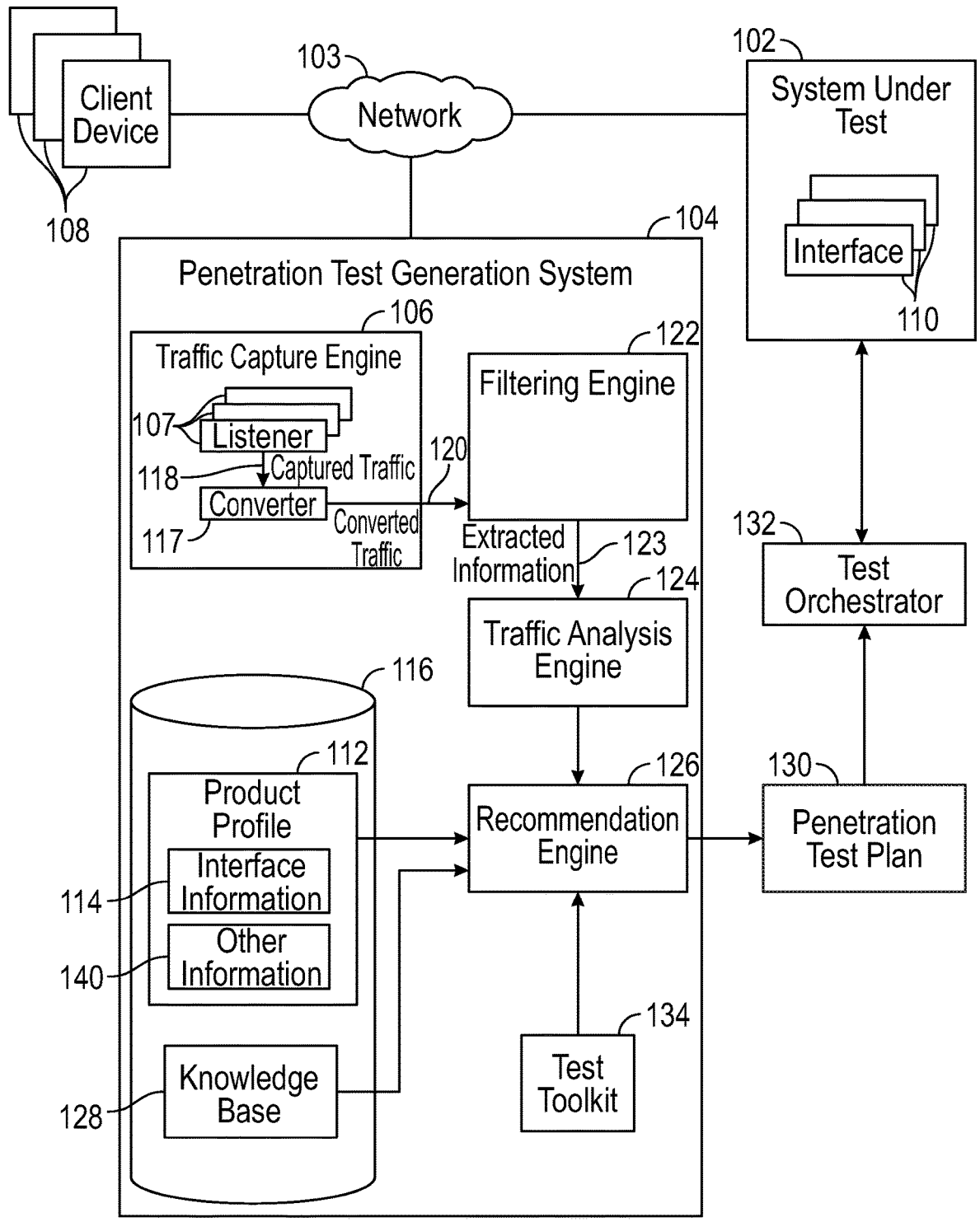
FIG. 1 is a block diagram of an arrangement that includes a penetration test generation system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Risk assessments of IT environments can be performed prior to production deployment of the IT environments. Such risk assessments may be requested by customers of resources to be used in the IT environments, or may be called for by compliance regulations or standards.

A type of risk assessment is referred to as penetration testing. Penetration testing involves performing a simulated attack on an IT environment to assess the security of the IT environment against attacks. The penetration testing can be performed to determine whether defenses of the IT environment to attacks are effective, and to identify vulnerabilities of the IT environment to attacks.

A test plan for a penetration test can include a set of actions that include searching for and exploiting vulnerabilities of resources in the IT environment. The actions of the test plan can include taking over control of resources such as computers, gathering information using the resources that have been taken over, selecting exploits to attack the IT environment, including lateral movement through the IT environment, and so forth.

Some IT environments can have a large number of resources that can interact with one another, and thus can be complex. The resources of an IT environment can be part of various different layers, including a physical layer (including hardware resources), a firmware layer (including firmware in the form of machine-readable instructions), an operating system (OS) layer (including an OS), an application layer (including application programs), and/or other layers. With attacks moving to lower level layers like the hardware layer and/or the firmware layer, selecting a penetration test that can effectively assess a complex IT environment from the hardware layer to the application layer can be difficult. In addition, the nature of information traffic communicated in the IT environment can be complex, since there can be a large number of communication protocols used by a large number of resources. In some cases, developing penetration tests for an IT environment can involve manual analysis of operations of the IT environment, which can be time-consuming and inaccurate. Also, penetration testing is a time bound activity and with the increasing desire to cover penetration testing from the hardware layer to the application layer, selecting an appropriate set of penetration test plans is very important to meet stringent compliance requirements. As a result, penetration tests developed based on manual analysis of information may be ineffective in identifying vulnerabilities of the IT environment.

In accordance with some implementations of the present disclosure, an automated system is provided to allow for the development of penetration tests for an IT environment based on various input information, including profile information of a system under test (SUT), collected information traffic communicated in the IT environment, and a knowledge base that includes information relating to vulnerabilities and threats.

An "SUT" can refer to a product or a collection of products that is able to communicate information over a network. A "product" can refer to a machine, machine-readable instructions (e.g., software or firmware), a cloud service, or any other entity that is able to communicate over a network.

FIG. 1 is a block diagram of an example arrangement that includes an SUT 102 that is to be the subject of penetration tests to be performed based on test plans produced by a penetration test generation system 104. The penetration test generation system 104 includes a traffic capture engine 106 that is able to capture information traffic communicated between a client device 108 (or multiple client devices 108) and the SUT 102 over a network 103.

As used here, a "network" can refer to any communication fabric used to transport information, with examples including a wired network and/or a wireless network. "Information traffic" can refer to various types of data that can be communicated between a client device 108 and the SUT 102, and/or control messages that can be exchanged between a client device 108 and the SUT 102.

The data and control messages can be according to any of various different types of communication protocols. Examples of communication protocols include a File Transfer Protocol (FTP) that is a protocol used for transfer of computer files between a client and a server, a Hypertext Transfer Protocol (HTTP) that is a protocol for transferring various data over the world wide web or other types of networks, a Lightweight Directory Access Protocol (LDAP) that is a protocol for accessing and maintaining distributed directory information services, and various other different types of protocols, whether standardized, open source, or proprietary.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The traffic capture engine 106 can include traffic listeners 107 that are able to detect data and control messages exchanged with respective interfaces 110 of the SUT 102. Control messages can include requests and responses to the requests, where a request can be according to any of various different protocols including those listed above.

A "traffic listener" can refer to logic (implemented using a hardware processing circuit or machine-readable instructions) that is part of the traffic capture engine 106 and that is used to capture information transmitted over the network 103 to or from a respective interface 110 of the SUT 102.

The SUT 102 can include various different types of interfaces 110 to perform different types of communications. For example, a first interface 110 can include a network interface that can communicate (send or receive) packets (e.g., Internet Protocol (IP) packets, Ethernet frames, etc.), netflow data, streaming telemetry (sFlow) data, and other types of data, over the network 103.

A second interface 110 can include an application interface, such as an Hypertext Markup Language (HTML) interface, a JavaScript interface, an HTTP interface, and so forth.

A third interface 110 can include an interface relating to remote access of a computer, such as a Remote Desktop Protocol (RDP) interface, a Secure Shell (SSH) interface, and so forth.

Although specific types of interfaces 110 are listed below, it is noted that in other examples, the SUT 102 can include additional or alternative interfaces.

For example, for HTTP traffic, a traffic listener 107 of the traffic capture engine 106 can monitor an HTTP interface 110 of the SUT 102 to detect HTTP traffic between a browser of a client device 108 and the SUT 102. Note that the traffic between a client device 108 and the SUT 102 over the network 103 can be based on activities of a user at the client device 108, a program at the client device 108 or at the SUT 102, or a hardware component of the client device 108 or at the SUT 102.

Other traffic listeners 107 can similarly monitor for information traffic of other interfaces 110 of the SUT 102.

The traffic capture engine 106 can access information in a product profile 112 to determine which interfaces 110 the traffic listeners 107 are to monitor. More specifically, the product profile 112 can include interface information 114 about the interfaces 110 of the SUT 102. For example, the interface information 114 can identify the types of interfaces that are in the SUT 102. The product profile 112 can be stored in a repository 116, which can be implemented using a storage device or multiple storage devices. Examples of storage devices can include a persistent storage device such as a disk-based storage device, a solid state storage device, and so forth. In other examples, the data repository 116 can also be implemented using a memory device (or multiple memory devices), which can include a volatile memory device or a non-volatile memory device.

The information traffic captured by the traffic listeners 107 can include traffic communicated with various different interfaces 110 of the SUT 102, and that are communicated using various different technologies. A "technology" can refer to a communication protocol used by the SUT 102, a type of interface of the SUT 102, a technology stack of the SUT 102, and so forth. A "technology stack" (or more simply, a "stack") can refer to a collection of layers (one layer or multiple layers), including any or some combination of the following: a physical layer, a firmware layer, an OS layer, an application layer, and/or other layers.

Since the information traffic captured by the traffic listeners 107 may be according to different technologies (and thus the information traffic may have different formats), the traffic capture engine 106 includes a converter 117 that converts from the format(s) of the captured information traffic 118 (which can be according to any of various different protocols) to a converted information traffic 120, which can be according to a target format. As examples, the captured information traffic 118 can include information in an HTTP message (e.g., an HTTP request or HTTP response), information in a JavaScript file, information in an HTML page, information in Transport Layer Security (TLS) or Secure Sockets Layer (SSL) packets, information in Transport Control Protocol (TCP) or User Datagram Protocol (UDP) packets, information in log files of an RDP or SSH interface, information in storage area network (SAN) packets, information in hardware interface data (e.g., data of a Universal Serial Bus (USB) interface), and so forth.

In some examples, the converted information traffic 120 produced by the converter 117 can be according to JavaScript Object Notation (JSON) format, which is a lightweight data-interchange format. In other examples, the converted information traffic 120 can be according to a different target format. The converted information traffic 120 can be subject to further processing by the penetration test generation system 104.

In some examples, the converted information traffic 120 is provided to a filtering engine 122, which applies filtering on the converted information traffic 120. As part of the filtering, any of various different tools can be used to extract relevant information. For example, the filtering engine 122 can extract any or some combination of the following from web traffic (information traffic communicated over the world wide web): click stream data (data generated based on user clicks or inputs) including a username, a network address (e.g., an IP address), a timestamp, an access request, a referenced uniform resource locator (URL), a domain name, a script (e.g., a JavaScript, a markup language file (e.g., an HTML file), a Common Gateway Interface (CGI) object, etc.), and so forth. In network traffic (information traffic communicated over a network such as a local area network (LAN), etc.), the filtering engine 122 can extract information about an unusual domain, a network address of an endpoint that is participating in communication of the network traffic, traffic associated with anomalous behavior, a clear text credential (such as a clear text password), data according to a weak protocol, a broken handshake process, and so forth.

The output of the filtering engine 122 includes extracted information 123.

The penetration test generation system 104 further includes a traffic analysis engine 124, which can analyze the extracted information 123 produced by the filtering engine 122.

In other examples, the traffic analysis engine 124 and the filtering engine 122 can be combined into one engine to perform the filtering and analysis tasks according to some examples.

Based on the extracted information 123, the traffic analysis engine 124 can identify protocols used at a port of a client device 108, and a protocol used at a port of a server, such as port of the SUT 102. A "port" refers to a network port that a computing device uses to communicate over a network. Examples of protocols include FTP, LDAP without TLS, HTTP, and so forth. Certain protocols, such as the foregoing, can be identified as being relatively weak protocols (also referred to as unsecured communication protocols). The determination of packets used can be based on application of a deep packet inspection of each packet in the extracted information 123.

Based on the extracted information 123, the traffic analysis engine 124 can determine a technology stack used by the SUT 102, where the technology stack (or more simply "stack") can include various layers, such as any of the following: a physical layer, a firmware layer, an OS layer, an application layer, and/or other layers.

For example, the determined technology stack can include information identifying a physical component used in the physical layer, a type of firmware used in the firmware layer, a type of OS used in the OS layer, and application(s) of the application layer. Examples of applications can include a PowerShell application from Microsoft, which provides a task automation and configuration management framework; an Angular JS application, which is a JavaScript-based open source front-end web framework for simplifying the development and testing of applications; a React JS application, which is a JavaScript library for building user interfaces, and so forth.

The traffic analysis engine 124 is also able to use the components identified by the filtering engine 122 to use the extracted information 123 to build a technology map of the SUT 102. The technology map can include the technology stack noted above, as well as can include other information, such as a web application used in the SUT 102, a cache used in the SUT 102, a database manager used in the SUT 102, a database used in the SUT 102, a JavaScript framework and libraries used in the SUT 102, a landing page builder used in the SUT 102, a web framework of the SUT 102, an application programming interface (API) of the SUT 102, and so forth. The technology map can also indicate relationships among the various components including those listed above.

The technology map can be used for the detection of malware, a security flaw, or other malicious traffic. The presence of such malware, security flaw, or malicious traffic in the SUT 102 may constitute an attack point that can compromise the SUT 102.

The penetration test generation system 104 further includes a recommendation engine 126 that is able to produce a penetration test plan 130 using information in the product profile 112, information produced by the traffic analysis engine 124, and a dynamic knowledge base 128. The knowledge base 128 is dynamic in the sense that certain portions of the knowledge base 128 can change over time. The penetration test plan 130 can include a collection of penetration tests that can be applied to test the SUT 102.

For example, a test orchestrator 132 can be used to run penetration test(s) included in the penetration test plan 130 against the SUT 102.

The knowledge base 128 can include various different types of knowledge base information. For example, a first type of knowledge base information can include information of trending vulnerabilities and threats (e.g., top N trending vulnerabilities or threats, where N≥1) that may be experienced by products similar to the SUT 102. For example, the first type of knowledge base can include a list of the vulnerabilities and threats and the relative rankings of the vulnerabilities and threats, where the rankings can be based on various factors, such as incident frequency, severity, etc.

A "vulnerability" of a system can refer to an aspect of the system (such as the system's OS, an application program running in the system, a hardware component in the system, etc.) that may be exploited by an attacker, such as malware or another entity. A "threat" can refer to an entity (e.g., a malware, a hacker, corrupted data or machine-readable instructions, etc.) that may cause malfunctioning or corruption or theft of information in the system.

A second type of knowledge base information includes information that correlates different types of technologies to corresponding different vulnerabilities and threats. For example, the second type of knowledge base information can correlate a technology such as a React JS application, with a cross-site scripting (XSS) threat. An XSS attack includes a type of injection in which a malicious script is injected into an otherwise benign and trusted website. The second type of knowledge base information can also correlate the React JS technology to a privilege escalation threat, where a privilege escalation exploits a bug, a design flaw, or a configuration oversight in a program to gain elevated access to resources that are normally protected from user or application access.

The second type of knowledge base information can correlate another technology, such as a PowerShell application, to a remote code execution vulnerability. Remote code execution refers to the ability of an attacker to gain access to a computing device to make changes, regardless of where the computing device is geographically located.

The second type of knowledge base information can also correlate an FTP client to a password crack vulnerability, in which an attacker can guess a password to gain unauthorized access.

The second type of knowledge base information can also correlate an HTML form technology to a weak input validation vulnerability. For example, if an HTML form includes a password field in which a user can enter a password, then that can be associated with weak input validation that can cause the password to be easily stolen.

The knowledge base 128 further includes a third type of knowledge base information, which can specify which technologies have protections against different vulnerabilities and threats. For example, a first technology may have a protection against a Structured Query Language (SQL) injection threat. An SQL injection attack involves an injection of an SQL query to inject malicious code into a program. The third type of knowledge base information can specify that another technology may have a protection against the XSS threat, and a further technology may have a protection against a privilege escalation threat. A technology has a "protection" against a given vulnerability or threat if the technology has a mechanism in place that is designed to prevent an attack according to the given vulnerability.

The third type of knowledge base information provides noise reduction to prevent including a test for a given vulnerability or threat in a penetration test plan if a corresponding technology already has a protection against the vulnerability or threat.

A fourth type of knowledge base information that can be included in the knowledge base 128 can identify new vulnerabilities and threats, as well as test cases that can be applied for the vulnerabilities and threats. This can aid in developing a test for a new vulnerability and threat that has not previously been encountered.

Although specific types of knowledge base information have been listed above, it is noted that the knowledge base 128 can include other information pertaining to vulnerabilities and threats that can be used by the recommendation engine 126 to generate the penetration test plan 130. The penetration test(s) in the penetration test plan 130 can be used to test for any vulnerability or threat, such as an XSS threat, a privilege escalation threat, a remote code execution vulnerability, a weak input validation vulnerability, a SQL injection threat, and so forth.

The product profile 112 can include various information (140) that can be used by the recommendation engine 126 to generate the penetration test plan 130. The following lists various examples (although additional or alternative examples are contemplated). The product profile information 140 can include product type information to identify a type of product of the SUT 102 (e.g., hardware, firmware, OS, an application, a switch, etc.). The product profile information 140 can include sub-category information, such as an OS type to identify a type of OS, a server type, a storage type, a management processor type, a client type, and so forth.

The recommendation engine 126 can select different types of penetration tests to include in the penetration test plan 130 for different types of products and/or different types of OS.

The product profile information 140 can include information identifying an industry associated with the SUT 102, such as finance, health care, critical infrastructure, government, and so forth. The recommendation engine 126 can select different types of penetration tests to include in the penetration test plan 130 depending upon which industry the SUT 102 relates to.

The product profile information 140 can include information specifying a penetration test mode, such as an automated mode (to run all automated penetration tests in the penetration test plan 130), a basic mode (in which high priority penetration tests are included by the recommendation engine 126 in the penetration test plan 130), a standard mode (in which a larger collection of penetration tests than in the basic mode are included by the recommendation engine 126 in the penetration test plan 130), an advanced mode (in which more advanced penetration tests are included by the recommendation engine 126 in the penetration test plan 130), and so forth. The recommendation engine 126 can select different types of penetration tests based on which penetration test mode is specified by the product profile information 140.

The product profile information 140 can also indicate a product risk (e.g., high, medium, low) to indicate the level of risk of the SUT 102. For example, if the risk is high, then the recommendation engine 126 can select higher priority penetration tests or a larger number of penetration tests to include in the penetration test plan 130.

The product profile information 140 can also indicate the penetration test scope, such as a full stack mode (in which all layers of the stack are tested), an application mode (in which applications are tested), a hardware mode (in which hardware is tested), a firmware mode (in which firmware is tested), a network mode (in which communication with a network is tested), and so forth.

In some examples, the recommendation engine 126 can select penetration tests to include in the penetration test plan 130 from a test toolkit 134. The test toolkit 134 can include metadata that includes fields that can map to product type, industry, a sub-category (e.g., server, storage, management processor, client, etc.), technology stack, and so forth. The metadata of the test toolkit 134 can also identify priorities of penetration tests.

The product profile information 140 and the output of the traffic analysis engine 124 can include various fields that can map to the metadata of the test toolkit 134. More specifically, product profile information 140 and the output of the traffic analysis engine 124 can index into entries of the test toolkit 134, where the indexed entries include penetration tests that can be included in the penetration test plan 130. Additionally, priorities indicated by the metadata of the test toolkit 134 can be used in selecting penetration tests to be included in the penetration test plan 130. For example, in some cases, higher priority penetration tests are selected to be included in the penetration test plan 130.

In addition, information from the knowledge base 128 can be used by the recommendation engine 126 in selecting penetration tests from the test toolkit 134 or removing penetration tests.

In further examples, following application of the penetration test plan 130, the recommendation engine 126 can attempt to use the technology stack and/or the technology map information produced by the traffic analysis engine 124 to help produce additional tests to discover other machines, as part of lateral movement in which an operation on a first machine can be used to discover other machines accessible by the first machine. For example, if a technology used is PowerShell with administrative access, then the protocols identified for a client and a server can be used to recommend a test to discover other machines and penetrate more machines. Such additional tests can also be based on the test toolkit 134.

In additional examples, the penetration test generation system 104 can be self-learning based on use of machine learning. The penetration test generation system 104 can produce a machine-learning model based on various fields in the product profile 112, output of the traffic analysis engine 124, and the knowledge base 128. The machine-learning model can be trained to produce penetration tests based on values of the fields. Then, the success of the penetration tests in identifying issues based on detected vulnerabilities and threats can be used to update the machine-learning model. In this way, the updated machine-learning model used by the penetration test generation system 104 can learn to produce more effective penetration tests given values of fields in the product profile 112, output of the traffic analysis engine 124, and the knowledge base 128. Example of machine-learning models include supervised vector machine (SVM), random forest and decision tree, and so forth.

Figure 2:
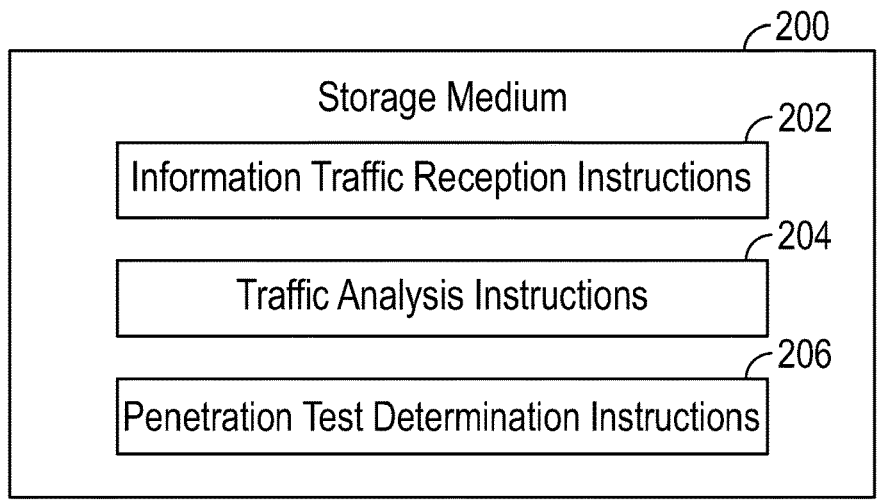
FIG. 2 is a block diagram of a storage medium storing machine-readable instructions according to some examples.

FIG. 2 is a block diagram of a non-transitory machine-readable or computer-readable storage medium 200 storing machine-readable instructions that upon execution cause a system to perform various tasks.

The machine-readable instructions include information traffic reception instructions 202 to receive information traffic communicated over a network by or with an SUT (e.g., 102 in FIG. 1).

The machine-readable instructions include information traffic analysis instructions 204 to analyze the information traffic to identify a potential attack point in the SUT and a technology used by the SUT. The potential attack point can include any aspect of the SUT that can subject the SUT to an attack. For example, the potential attack point can include an interface (e.g., 110 in FIG. 1) of the SUT that employs an unsecured communication protocol (e.g., FTP, LDAP without TLS, HTTP, etc.). As another example, the potential attack point can include a component of the SUT that employs a clear text credential (e.g., a password transmitted in the clear between a client device and the SUT over a network). As a further example, the potential attack point can include a design violation in data communications to or from the SUT. Examples of design violations include any or some combination of the following: a broken handshake process (in which an exchange of handshaking messages between a client and a server is incomplete), unusual content (content in information traffic that is unexpected or that violates a rule or policy), storage of a clear text credential, use of a communication protocol that is unsecured, and so forth. As another example, the potential attack point can include a potential malware that has infected the SUT. More generally, example types of potential attack points can include unprotected or weakly protected interfaces (e.g., interfaces that employ specific protocols or combinations of protocols), components that employ weakly protected credentials (e.g., credentials in clear text or credentials with weak cryptographic or other protection mechanisms), design violations, infected components, and so forth.

The identified technology as identified by the information traffic analysis instructions 204 can include a client and server communication protocol used by a client (e.g., 108 in FIG. 1) and a server (e.g., the SUT 102 of FIG. 1). The ability to discover a protocol used by a client can better aid in developing penetration tests by the recommendation engine 126 of FIG. 1.

The identified technology can include a type of interface of the SUT, a technology stack of the SUT, a role name in the SUT, and so forth. Examples of role names in the SUT include "administrator," "operator," and so forth. Depending on the role name, that may indicate which penetration tests to employ. For example, if a role name of administrator is present in the SUT, then that indicates that the SUT may have higher privileges that can allow a privilege escalation attack to proceed successfully. In such examples, a selected penetration test to include in the penetration test plan 130 can be one to test for a privilege escalation threat.

The machine-readable instructions include penetration test determination instructions 206 to determine a collection of penetration tests (such as included in the penetration test plan 130 of FIG. 1) for testing a technology stack including a plurality of layers associated with the SUT. The determination of the collection of penetration tests is based on the identified potential attack point and the identified technology, and further based on a dynamic knowledge base (e.g., 128 in FIG. 1) that includes information relating to vulnerabilities and threats.

Figure 3:
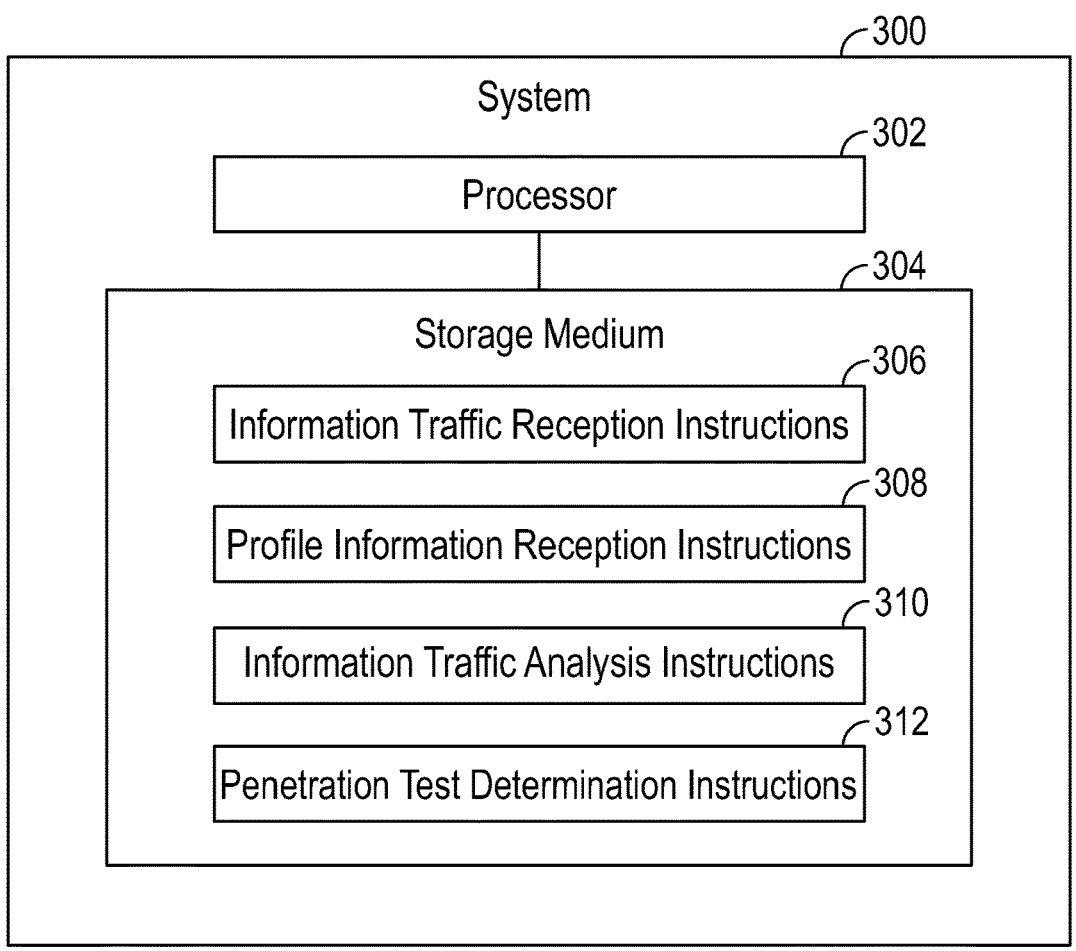
FIG. 3 is a block diagram of a system according to some examples.

FIG. 3 is a block diagram of a system 300, such as the penetration test generation system 104 of FIG. 1. The system 300 can be implemented using a computer or multiple computers.

The system 300 includes a hardware processor 302 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 300 a storage medium 304 storing machine-readable instructions executable on the hardware processor 302 to perform various tasks. Machine-readable instructions executable on a hardware processor can refer to the instructions executable on a single hardware processor or the instructions executable on multiple hardware processors.

The machine-readable instructions include information traffic reception instructions 306 to receive information traffic communicated over a network by or with an SUT.

The machine-readable instructions include profile information reception instructions 308 to receive profile information of the SUT, the profile information indicating a penetration test mode for the SUT.

The machine-readable instructions include information traffic analysis instructions 310 to analyze the information traffic to identify a technology used by the SUT.

The machine-readable instructions include penetration test determination instructions 312 to determine a collection of penetration tests for testing the SUT based on the identified technology and the penetration test mode indicated by the profile information, and further based on a dynamic knowledge base that includes information relating to vulnerabilities and threats.

Figure 4:
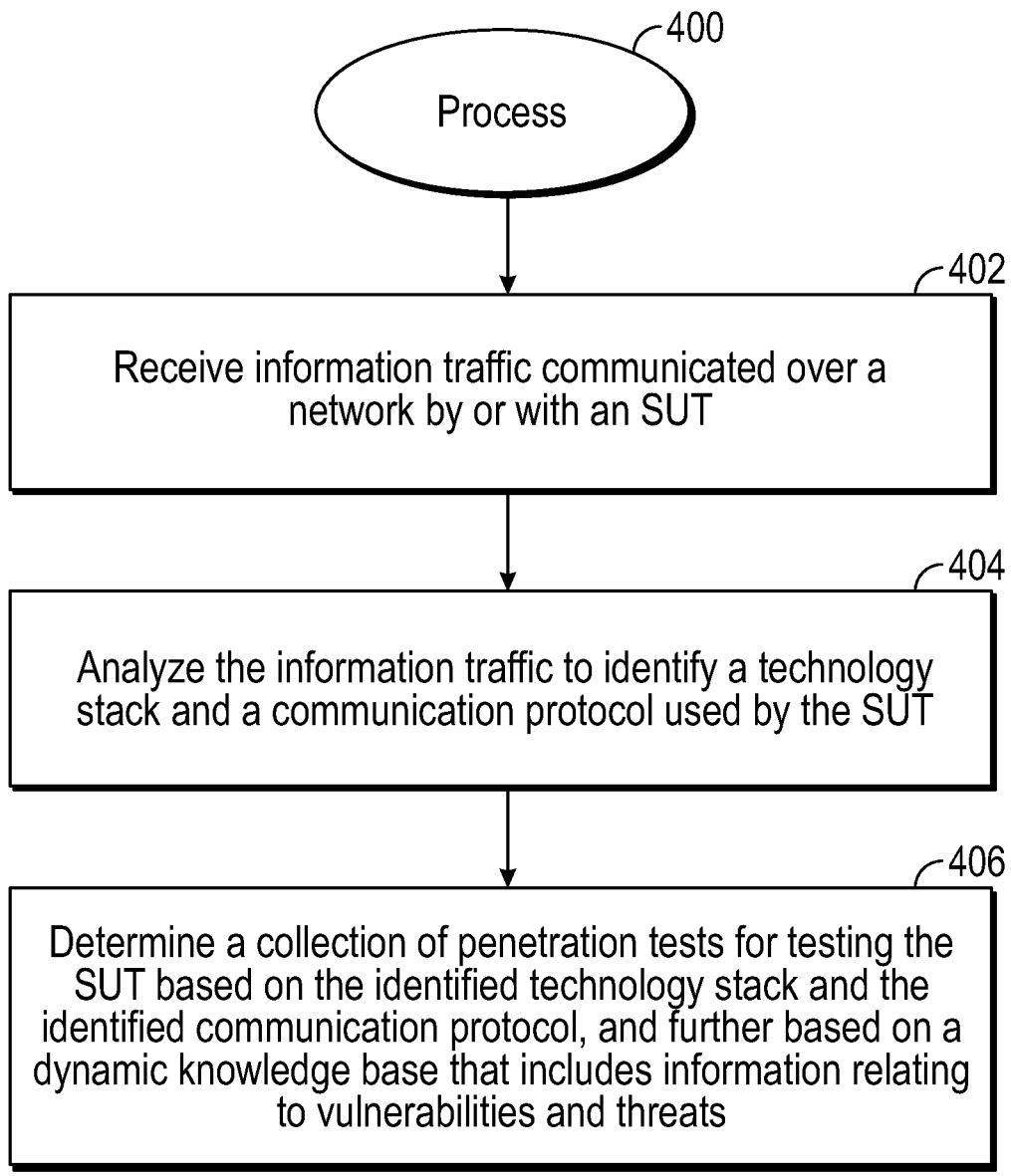
FIG. 4 is a flow diagram of a process according to some examples.

FIG. 4 is a flow diagram of a process 400 according to some examples, which can be performed by the penetration test generation system 104 or another system.

The process 400 includes receiving (at 402) information traffic communicated over a network by or with an SUT.

The process 400 incudes analyzing (at 404) the information traffic to identify a technology stack and a communication protocol used by the SUT.

The process 400 includes determining (at 406) a collection of penetration tests for testing the SUT based on the identified technology stack and the identified communication protocol, and further based on a dynamic knowledge base that includes information relating to vulnerabilities and threats.

A storage medium (such as the storage medium 200 of FIG. 2) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

receive information traffic communicated over a network by or with a system under test (SUT);
receive profile information of the SUT, the profile information indicating a penetration test mode for the SUT;
analyze the information traffic to identify a technology used by the SUT; and
determine a collection of penetration tests for testing a stack comprising a plurality of layers associated with the SUT based on the identified technology and the penetration test mode indicated by the profile information, and further based on a dynamic knowledge base that includes information relating to vulnerabilities and threats, wherein the dynamic knowledge base correlates different technologies to different vulnerabilities and threats, and specifies a protection used by a technology against a vulnerability or threat,
wherein the determining of the collection of penetration tests for testing the stack is based on information of a first vulnerability or threat retrieved from the dynamic knowledge base, the first vulnerability or threat correlated by the dynamic knowledge base to the identified technology, and
wherein the determining of the collection of penetration tests for testing the stack does not test for a second vulnerability or threat responsive to the dynamic knowledge base specifying that the identified technology as identified by the analyzing of the information traffic has the protection against the second vulnerability or threat.

2. The non-transitory machine-readable storage medium of claim 1, wherein the analyzing of the information traffic identifies a potential attack point in the SUT, the identified potential attack point comprising an interface of the SUT that employs an unsecured communication protocol, and wherein the determining of the collection of penetration tests is further based on the identified potential attack point.

3. The non-transitory machine-readable storage medium of claim 1, wherein the analyzing of the information traffic identifies a potential attack point in the SUT, the identified potential attack point comprising a component of the SUT that employs a clear text credential, and wherein the determining of the collection of penetration tests is further based on the identified potential attack point.

4. The non-transitory machine-readable storage medium of claim 1, wherein the analyzing of the information traffic identifies a potential attack point in the SUT, the identified potential attack point comprising a design violation in data communications, and wherein the determining of the collection of penetration tests is further based on the identified potential attack point.

5. The non-transitory machine-readable storage medium of claim 1, wherein the analyzing of the information traffic identifies a potential attack point in the SUT, the identified potential attack point comprising a potential malware that has infected the SUT, and wherein the determining of the collection of penetration tests is further based on the identified potential attack point.

6. The non-transitory machine-readable storage medium of claim 1, wherein the identified technology comprises a client and server communication protocol used by a client and the SUT.

7. The non-transitory machine-readable storage medium of claim 1, wherein the identified technology comprises a type of interface of the SUT.

8. The non-transitory machine-readable storage medium of claim 1, wherein the identified technology comprises a technology stack of the SUT.

9. The non-transitory machine-readable storage medium of claim 1, wherein the dynamic knowledge base identifies trending vulnerabilities and threats, and wherein the determining of the collection of penetration tests for testing the SUT is based on at least one vulnerability or threat of the trending vulnerabilities and threats.

10. The non-transitory machine-readable storage medium of claim 1, wherein the determining of the collection of penetration tests comprises selecting a test plan from a test toolkit that includes a plurality of different test plans correlated to different combinations of vulnerabilities, threats, technologies, product types, and communication protocols.

11. The non-transitory machine-readable storage medium of claim 1, wherein the penetration test mode comprises an automated penetration test mode.

12. The non-transitory machine-readable storage medium of claim 1, wherein the profile information further indicates a risk level of a plurality of risk levels for the SUT, and wherein the determining of the collection of penetration tests is further based on the risk level indicated by the profile information.

13. The non-transitory machine-readable storage medium of claim 1, wherein the instructions upon execution cause the system to:
discover, based on the analyzing of the information traffic, a role name in the SUT,
wherein the determining of the collection of penetration tests is further based on the role name.

14. The non-transitory machine-readable storage medium of claim 1, wherein the instructions upon execution cause the system to:
perform the collection of penetration tests; and
determine a further penetration test based on the identified technology, the further penetration test to perform lateral movement to a further machine in the network.

15. A system comprising:
a processor; and
a non-transitory machine-readable storage medium storing instructions executable on the processor to:
receive information traffic communicated over a network by or with a system under test (SUT);
receive profile information of the SUT, the profile information indicating a penetration test mode for the SUT;
analyze the information traffic to identify a technology used by the SUT; and
determine a collection of penetration tests for testing the SUT based on the identified technology and the penetration test mode indicated by the profile information, and further based on a dynamic knowledge base that includes information relating to vulnerabilities and threats, wherein the dynamic knowledge base correlates different technologies to different vulnerabilities and threats, and specifies a protection used by a technology against a vulnerability or threat,
wherein the determining of the collection of penetration tests for testing the SUT is based on information of a first vulnerability or threat retrieved from the dynamic knowledge base, the first vulnerability or threat correlated by the dynamic knowledge base to the identified technology, and
wherein the determining of the collection of penetration tests for testing the SUT does not test for a second vulnerability or threat responsive to the dynamic knowledge base specifying that the identified technology as identified by the analyzing of the information traffic has the protection against the second vulnerability or threat.

16. The system of claim 15, wherein the analyzing of the information traffic identifies a potential attack point in the SUT, and wherein the determining of the collection of penetration tests is further based on the identified potential attack point.

17. A method performed by a system comprising a hardware processor, comprising:
 receiving information traffic communicated over a network by or with a system under test (SUT);
 receiving profile information of the SUT, the profile information indicating a penetration test mode for the SUT;
 analyzing the information traffic to identify a technology used by the SUT; and
 determining a collection of penetration tests for testing the SUT based on the identified technology and the penetration test mode indicated by the profile information, and further based on a dynamic knowledge base that includes information relating to vulnerabilities and threats, wherein the dynamic knowledge base correlates different technologies to different vulnerabilities and threats, and specifies a protection used by a technology against a vulnerability or threat,
 wherein the determining of the collection of penetration tests for testing the SUT is based on information of a first vulnerability or threat retrieved from the dynamic knowledge base, the first vulnerability or threat correlated by the dynamic knowledge base to the identified technology, and
 wherein the determining of the collection of penetration tests for testing the SUT does not test for a second vulnerability or threat responsive to the dynamic knowledge base specifying that the identified technology as identified by the analyzing of the information traffic has the protection against the second vulnerability or threat.

18. The method of claim 17, wherein the dynamic knowledge base identifies trending vulnerabilities and threats.

* * * * *